United States Patent

[11] 3,607,911

| [72] | Inventors | Yoshitaka Ikezuki;<br>Sadayoshi Fujimori; Kawashima Yuji;<br>Yoshihisa Nozaki, all of Tokyo, Japan |
|---|---|---|
| [21] | Appl. No. | 756,547 |
| [22] | Filed | Aug. 30, 1968 |
| [45] | Patented | Sept. 21, 1971 |
| [73] | Assignee | Yamanouchi Pharmaceutical Co., Ltd.<br>Tokyo, Japan |
| [32] | Priority | Aug. 31, 1967 |
| [33] | | Japan |
| [31] | | 42/55490 |

[54] BASIC AMINO ACID SALTS OF CHLORAMPHENICOL SUCCINATE
1 Claim, 1 Drawing Fig.

[52] U.S. Cl........................................................ 260/485 G,
424/313
[51] Int. Cl........................................................ A61k 27/00,
C07c 69/40, C07c 103/40
[50] Field of Search........................................... 260/485 G

[56]                  References Cited
            OTHER REFERENCES
Wilson et al., Textbook of Organic Medicinal and Pharmaceutical Chemistry, 5th Ed., pp. 338– 340, (1966)

*Primary Examiner*—Lewis Gotts
*Assistant Examiner*—E. J. Skelly
*Attorney*—Wenderoth, Lind & Ponack

ABSTRACT: The basic amino acid salts of chloramphenicol succinate cause little or no pain when administered intramuscularly to human beings.

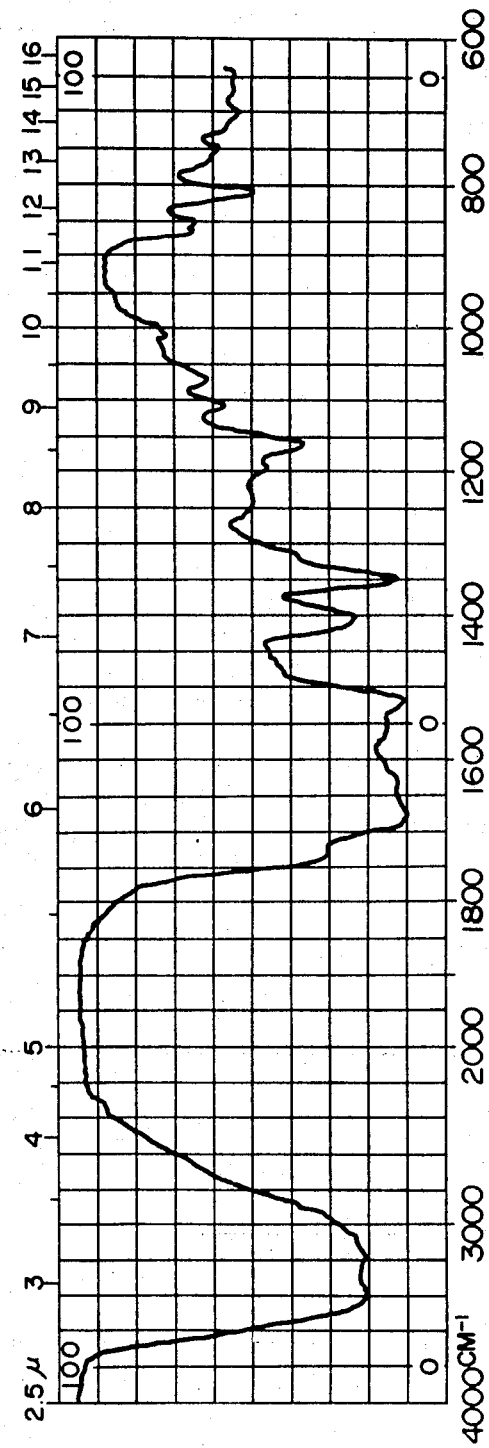
YOSHITAKA IKEZUKI,
SADAYOSHI FUJIMORI,
YUJI KAWASHIMA and
YOSHIHISA NOZAKI
INVENTORS

BASIC AMINO ACID SALTS OF CHLORAMPHENICOL SUCCINATE

This invention relates to salts of chloramphenicol succinate with basic amino acids. It further relates to the use of the basic amino acid salts of chloramphenicol by intramuscular injection with little or no pain when administered to human beings.

It is known that chloramphenicol itself in the form of suspension can be used for an intramuscular injection which does not cause much pain and which maintains a prolonged blood level. However, the suspension has the disadvantage that it does not show a rise into a high blood level in a short time (which means immediate effect).

On the other hand, the sodium salt of chloramphenicol succinate is widely used for intravenous injections because it readily dissolves in water and because after it is administered, it rapidly decomposes so that the blood level of the chloramphenicol rises quickly.

This sodium salt of chloramphenicol succinate cannot be used for intramuscular injections because it causes violent pain which, even when local anesthetics are added to the injection solution, cannot be sufficiently reduced. This renders the use of the sodium salt of chloramphenicol succinate impractical for intramuscular injections. Moreover, there are also dangers such as unexpectedly causing shock in hypersensitive patients.

It has now been found that the salt of chloramphenicol succinate with a basic amino acid selected from the group consisting of arginine, lysine and ornithine is not only easily dissolved in water, but when administered intramuscularly, causes little or no pain.

A basic amino acid salt of chloramphenicol succinate of this invention can be prepared by mixing a solution or a suspension of chloramphenicol succinate with a solution of a stoichiometric quantity of the corresponding basic amino acid. As solvents, water and/or alcohol can be employed.

The basic amino acid salt of chloramphenicol succinate can be isolated by either evaporating the solvent in a vacuum or by adding an organic solvent in which the salt is at the most only slightly dissolved, and then filtering the precipitated salt.

The basic amino acid salt of chloramphenicol succinate can be prepared as dry solid medicament for injection use by dissolving it in distilled water and then filtering it with a bacterial filter and then freeze-drying it. The amount of the basic amino acid salt of chloramphenicol succinate to be administered to human beings can be calculated according to the data of the U.S. Pharmacopeia XVII, page 117.

The following is a report of the tests concerning pain produced by the intramuscular administration of the basic amino acid salts of chloramphenicol succinate of this invention, and their results.

TEST 1

The degree of pain caused by the intramuscular administration of chloramphenicol succinate in dogs has been determined by the various degrees of behavior patterns such as barking, attempts to bite, and the turning of the head. An aqueous solution of each of sodium salt of chloramphenicol succinate, hereafter referred to as CPS-Na, arginine salt of chloramphenicol succinate, hereafter referred to as CPS-Arg, lysine salt of chloramphenicol succinate, and ornithine salt of chloramphenicol succinate, each having the concentration of 250 mg./ml., was intramuscularly injected into the femoral muscle of the hindlimb of 10 mongrel male dogs of average body weight of 10 kg. at the rate of 50 mg. per kilogram of body weight. As a blank, a physiological saline solution was used. The results of the test are shown in Table 1. The significance of the marks −, ±, +, ++, +++ in the table is as follows:

− : did not register any pain
± : reaction to pain unclear

TABLE 1

| Number of animals | Physiological saline (blank) | | CPS-Na | | CPS-Arg | | Lysine salt of chloramphenicol succinate | | Ornithine salt of chloramphenicol succinate | |
|---|---|---|---|---|---|---|---|---|---|---|
| | During injection | After injection | During injection | After injection | During injection | After injection | During injection | After injection | During injection | After injection |
| 1 | + | − | +++ | +++ | ± | − | + | − | + | − |
| 2 | ± | − | ++ | +++ | ± | − | + | − | + | − |
| 3 | + | − | +++ | ++ | + | − | ± | − | + | − |
| 4 | + | − | +++ | +++ | + | − | ± | − | + | − |
| 5 | ± | − | +++ | +++ | + | − | ± | − | + | − |
| 6 | ± | − | ++ | +++ | ± | − | + | − | ± | − |
| 7 | + | − | +++ | ++ | ± | − | + | − | + | − |
| 8 | + | − | +++ | +++ | + | − | + | − | ± | − |
| 9 | + | − | +++ | +++ | + | − | ± | − | + | − |
| 10 | + | − | ++ | ++ | + | − | + | − | + | − |

\+ : showed slight reaction to pain
++ : showed obvious reaction to pain
+++ : showed violent reaction to pain As is manifest from the above Table 1, the dogs to which CPS-Na was administered intramuscularly registered violent and/or obvious pain during and after the injection but when the compounds according to this invention were administered intramuscularly, the dogs registered little or no pain during and after the injection.

TEST 2

Injections of CPS-Na which contained various types of local anesthetics and an injection of CPS-Arg were administered intramuscularly to human beings and their reactions were tested and recorded. 4 ml. of an aqueous solution of 1.49 g. of CPS-Na and 1.85 gr of CPS-Arg (each corresponding to 1.0 g. of chloramphenicol) were injected intramuscularly into the upper part of the arms of human subjects and the pain they registered during and after the injection is summarized in Table 2.

TABLE 2

| Number of patients tested | Probe | Type of anaesthetic used and the quantity | Observations |
|---|---|---|---|
| 6 | CPS-Na | | Administration was stopped after 0.2–0.4 ml. of injection because of violent pain. |
| 1 | Same | 2-butoxy-N-(2-diethylaminoethyl)cinchoninamide hydrochloride, 0.5%. | Administration was stopped after 0.5 ml. of injection because of violent pain. |
| 1 | do | Benzyl alcohol, 2.0%. | Patient registered pain at time of injection and pain increased after 15 minutes; sensation at finger tips was lost. |
| 1 | do | 1-methyl-N-2′,6′-pipecoloxylidide hydrochloride, 1.0%. | Patient registered pain at time of injection; turned red in color at point of injection; pain grew worse. |
| 1 | do | N-diethylaminoaceto-2,6-xylidide hydrochloride, 0.5%. | Patient registered much pain at time of injection; after 1 hour, sensation of injected arm lost; pain persisted. |
| 1 | do | do | Patient registered much pain at time of injection; after 30 minutes, hives-like red rash appeared on neck and chest. |
| 2 | do | 2-methyl-2-propylaminopropyl benzoate hydrochloride, 0.5%. | Administration was stopped after 1–1.3 ml. of injection because of violent pain. |
| 6 | CPS-Arg | | Registered no pain at time of injection and even 24 hours later. |
| 6 | Physiological saline | | Do. |

TEST 3

Concerning the length of time pain persisted when injection of CPS-Na (contained local anaesthetic) and injection of CPS-Arg were injected into human beings:

Ten healthy volunteers were separated into two equal groups. To one group 5 ml. of an aqueous solution of 1.85 g. of CPS-Arg (corresponding to 1.0 g. of chloramphenicol) was administered intramuscularly and to the other, 5 ml. of an aqueous solution of 1.49 g. of CPS-Na (corresponding to 1.0 g. of chloramphenicol) which contained N-diethylaminoaceto-2, 6-xylidide in the deltoid muscle of the upper arm, and the degree of pain was compared. The results are shown in Table 3.

TABLE 3

| Observations | Probe | CPS-Arg (5 volunteers) | CPS-Na (5 volunteers) |
| --- | --- | --- | --- |
| After probe was administered. | 1. Little or no pain registered | 1 | 0 |
| | 2. Some but insignificant pain registered. | 4 | 1 |
| | 3. Strong but bearable pain registered. | 0 | 2 |
| | 4. Violent pain registered; patient asked never to be given injection again. | 0 | 2 |
| Time when pain appeared. | 1. At time of administration | 0 | 5 |
| | 2. Right after administration | *1 | 0 |
| | 3. 5–7 min. after administration. | *4 | 0 |
| Length of time pain persisted. | 1. At time of administration | 0 | 0 |
| | 2. 0–10 minutes | 0 | 3 |
| | 3. 10–20 minutes | *1 | 0 |
| | 4. 20–30 minutes | *2 | 1 |
| | 5. 30–60 minutes | *1 | 1 |

*Registered slight pain.

As can be seen from the results of Tables 2 and 3, CPS-Na causes violent pain at the time of intramuscular administration and after. Even when a local anesthetic is added, the pain at the time of administration remained quite violent. On the other hand, when a salt of this invention (for example, CPS-Arg) is used, the subjects register little or no pain at the time of intramuscular injection or afterwards even when local anesthetics are not used. The degree of pain registered when a contrast of a physiological saline solution was used was about the same.

The accompanying figure of drawing is the infrared spectrum of CPS-Arg which was prepared by Example 1.

1. This spectrum shows no absorption of —COOH group at over 1700, 1250 and 920 $cm^{-1}$.
2. This spectrum shows the absorption of COO¹ group at 1600 and 1400 $cm^{-1}$.

EXAMPLE 1

13.1 g. of chloramphenicol succinate (hereinafter abbreviated as CPS) were suspended in 13 ml. of water, and then 5.3 g. of L-arginine free base were gradually added into the resulting suspension while stirring. The mixture became a clear pale yellow in color when it was stirred continuously for 5 minutes. By gradually adding 500 ml. of dioxane to the reaction mixture, crystals of CPS-L-arginine were precipitated. The crystals were then filtered and washed with a small amount of dioxane and dried. Yield: 14.7 g. Melting point: 145° C. (decomp.) $[\alpha]^{20}_D = +8.6 \pm 0.5$ (C = 10.0 water) Elementary analysis as $C_{12}H_{30}N_6O_{10}Cl_2$:

| | C (%) | H (%) | N (%) |
| --- | --- | --- | --- |
| Calculated | 42.22 | 5.06 | 14.07 |
| found | 42.61 | 5.14 | 13.88 |

The infrared spectrum of the object of this example is as per the accompanying figure of drawing.

EXAMPLE 2

15 ml. of water were added into 13.1 g. of CPS and to this solution was added a water solution of basic L-arginine which was prepared by passing the water solution of 6.6 g. of L-arginine hydrochloride through an ion exchange resin. The thus-obtained clear reaction mixture was concentrated under vacuum to about 25 ml., and 500 ml. of acetone was gradually added to precipitate the CPS-L-Arg, which was filtered and washed with a small amount of acetone and dried. Yield: 14.9 g.

EXAMPLE 3

130.9 g. of CPS were suspended into 250 ml. of distilled water for injection and while stirring, 53.8 g. of L-arginine free base was added. Distilled water for injection was added to the solution until its volume was 400 ml. and it was then filtered in a bacterial filter and then aseptically divided into vials of 4 ml. and freeze-dried. Each vial contained 1.85 g. of CPS-L-arg (1.0 g. of chloramphenicol). The infrared spectrum of the object of this example was the same as that of Example 1.

EXAMPLE 4

To 12.7 g. of CPS, 15 ml. of water were added and than a water solution of 4.4 g. of L-lysine, which was prepared by passing a water solution of 5.6 g. of L-lysine hydrochloride through an ion exchange resin (OH type). The thus-obtained clear reaction mixture was concentrated under vacuum to about 25 ml. and then 500 ml. of acetone were gradually added to precipitate the CPS-L-lysine which was filtered and washed with a small quantity of acetone and dried. Yield: 11.1 g. Melting point: 115–118° C.

EXAMPLE 5

15 ml. of water were added into 12.7 g. of CPS and to this solution was added a water solution of basic L-ornithine which was prepared by passing the water solution of 5.1 g. of L-ornithine hydrochloride through an ion exchange resin (OH type). The thus-obtained clear reaction mixture was treated in the same manner as in Example 1 and CPS-L-ornithine was obtained. Yield, 10.0 g. Melting point of crystals which are recrystallized from a mixture of n-butanol and water (volume ratio 100:1) : 112–114° C.

EXAMPLE 6

1.74 g. of L-arginine was gradually added while stirring into a solution of 4.23 g. of chloramphenicol succinate in 50 ml. of ethanol. Upon completion of the addition, the system was stirred further for some time, whereby the L-arginine was dissolved, and soon needlelike crystals precipitated. Then after stirring for 1 hour, the crystals were filtered and washed with cold ethanol and thus CPS-L-arginine was obtained. Yield: 5.5 g. Melting point: 145° C. (decomp.). The product is already sufficiently pure but if necessary it can be recrystallized from a mixture of ethanol: methanol (volume ratio 8:2).

EXAMPLE 7

365 mg. of CPS was dissolved in 10 ml. of ethanol and the solution was added into a solution of 113.8 mg. of L-ornithine in ethanol, whereby the solution became slightly cloudy. When a mixture of ethyl acetate and ether (volume ratio 2:1) was added, the solution became cloudier. CPS-L-ornithine precipitates when the solution is cooled. The precipitate is filtered and washed with a mixture of ethyl acetate and ether and dried. Yield: 363 mg. Melting point of crystals which are recrystallized from a mixture of n-butanol and water (volume ratio 100:1) : 112–114° C. Elementary analysis as $C_{20}H_{28}O_{10}N_4Cl_2$

|  | C (%) | H (%) | N (%) |
|---|---|---|---|
| Calculated | 43.25 | 5.08 | 10.09 |
| Found | 43.24 | 5.41 | 9.79 |

EXAMPLE 8

202 mg. of L-lysine were dissolved in 4 ml. of water and 584 mg. of chloramphenicol succinate were added to the resultant solution. The thus-obtained clear reaction mixture was freeze-dried.

Then the product was dissolved in 1 ml. of methanol, after which a mixture of ethyl acetate and ether (volume ratio of 2:1) was added, while stirring, thus obtaining CPS-L-lysine. Then it was filtered and washed with a mixture of ethyl acetate and ether and dried. Yield: 534 mg. Melting point 115–118° C. Elementary analysis as $C_{21}H_{30}N_4O_{10}Cl_2$:

|  | C (%) | H (%) | N (%) |
|---|---|---|---|
| Calculated | 44.29 | 5.31 | 9.81 |
| Found | 43.96 | 5.61 | 9.81 |

The salts according to this invention—which in the system effectively act as the free chloramphenicol itself—are used for the purposes for which chloramphenicol is employed and in amounts corresponding to the dosages in which the latter is used in human and in veterinary medicines. As aforeindicated, the pain usually associated with prior intramuscular administration is circumvented.

What is claimed is:

1. A salt of chloramphenicol succinate with a basic amino acid selected from the group consisting of L-arginine, L-lysine and L-ornithine.